Oct. 22, 1963
V. E. GEX ETAL
3,107,702
CONTROLLED VOLUMETRIC FILLING OF GRANULAR
PRODUCT INTO CONTINUOUSLY MOVING POCKETS
Filed Oct. 14, 1960
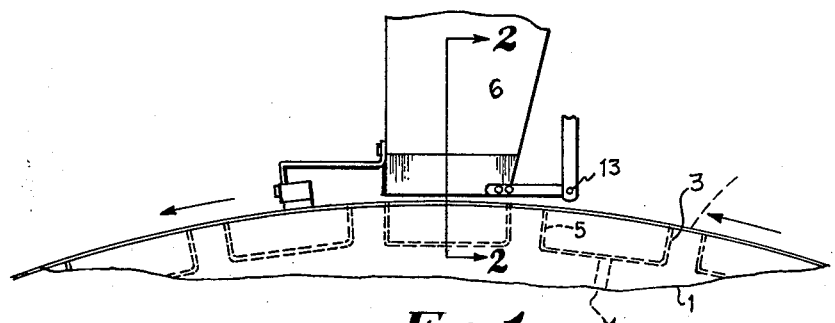
FIG 1
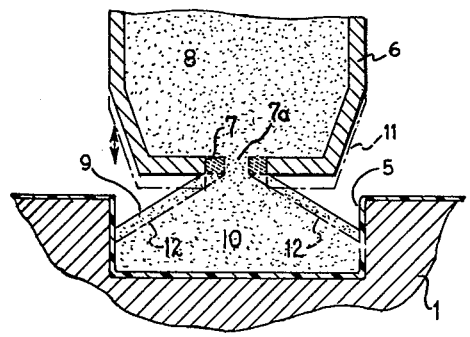
FIG. 2.
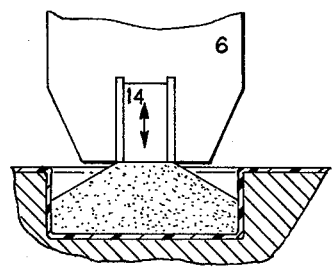
FIG. 3.
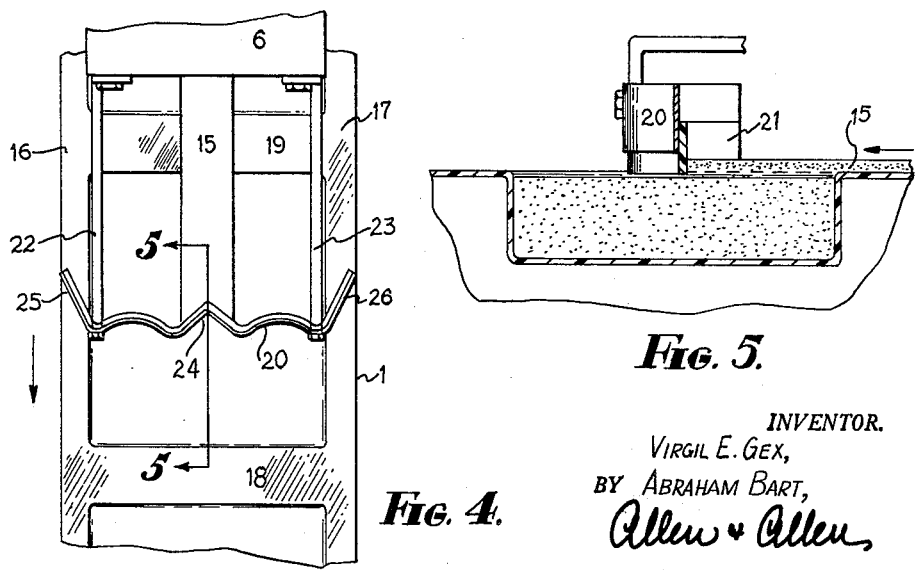
FIG. 4.
FIG. 5.
INVENTOR.
VIRGIL E. GEX,
BY ABRAHAM BART,
Allen & Allen
ATTORNEYS.

United States Patent Office 3,107,702
Patented Oct. 22, 1963

3,107,702
CONTROLLED VOLUMETRIC FILLING OF GRANULAR PRODUCT INTO CONTINUOUSLY MOVING POCKETS
Virgil E. Gex, Wyoming, and Abraham Bart, Springfield Township, Hamilton County, Ohio, assignors to The Procter & Gamble Company, Cincinnati, Ohio, a corporation of Ohio
Filed Oct. 14, 1960, Ser. No. 62,606
13 Claims. (Cl. 141—1)

The invention has to do with the packaging of granular materials in packets, generally, but not necessarily formed of film-like substances. For the sake of an exemplary showing, but not as a limitation, the invention will be described in connection with a packeting apparatus and procedure set forth in the copending application of Gex and Kramer, Serial No. 61,509, filed October 10, 1960, entitled Sealing Soluble Film Packets, now Patent 3,057,127 and assigned to the same assignee.

In the procedure of that application, a first strip of water-soluble, thermoplastic film, such as polyvinyl alcohol, is led against the surface of a moving member. The surface is configured to provide recesses forming pockets with intervening and marginal lands or ridges; the film strip is led against this member, and while adhering to the lands, is drawn down into the pockets by vacuum, so as to form pockets in the film. The film pockets are then filled with a granular substance—in this case a spray-dried detergent material—after which a second strip of water-soluble, thermoplastic film is led onto the moving member so as to cover the first strip including the filled pockets thereof. The two film strips are sealed together on the lands, forming a packet composite which can be then cut apart into individual packets. The packets are of high utility because they may be introduced as such into a washing machine or the like, the film substance dissolving completely in the water therein.

In such a procedure, as in others of like character, a considerable problem is encountered in filling the pockets accurately with the granular contents. Especially, where the pockets to be filled are both small and numerous, and where the moving member carries a large number of the pockets past a filling station in a comparatively short time, gravimetric modes of filling are not satisfactory. They involve complex and costly apparatus, and they do not always deposit the charge accurately in the pockets.

On the other hand, volumetric modes of filling, as hitherto conceived, have not taken into account possible changes in the specific gravity of the granular material; they are likely to deposit the granules on the lands in such a way as to interfere with the sealing of the film strips to each other; and if any excess of the granular material is deposited, as by a hopper, this excess tends to become cumulative, interfering with continuous operation.

Attempts to deposit in each pocket measured increments of the granular materials, as by pocketed drums and the like, have likewise failed of completely satisfactory operation.

It is a primary object of the invention to provide an apparatus and procedure for volumetric filling which will be devoid of the above difficulties.

Specifically it is an object of the invention to provide an apparatus and procedure for volumetric filling which will accomplish an accurate metering of granules into moving pockets.

It is another object of the invention to provide an apparatus and method for volumetric filling in which the fill may be varied to compensate for variations in density of the granular substance.

These and other objects of the invention which will be set forth hereinafter or will be apparent to one skilled in the art upon reading these specifications are accomplished by that construction and arrangement of parts and in that procedure of which certain exemplary embodiments will now be described. Reference is made to the accompanying drawings wherein:

FIG. 1 is a partial elevational view of an exemplary moving means and filling station.

FIG. 2 is a partial sectional view taken along the section line 2—2 of FIG. 1. This view is of diagrammatic character illustrating modes of varying the volume of the fill.

FIG. 3 is a partial view of the down stream end of the hopper in one form of the invention.

FIG. 4 is a partial plan view showing a portion of the moving member, a portion of the hopper, and a portion of a scraping element.

FIG. 5 is a partial sectional view taken along the section line 5—5 of FIG. 4.

While the granular material used in the practice of the invention is not necessarily a spray-dried granular material, it may be pointed out that spray-drying operations have been so standardized that in any given run with any given formula, granules of a uniform size, or range of sizes, are uniformly and dependably produced. Nevertheless, with variations in formulation and as between runs, differences in density do occur. Consequently, it becomes necessary to provide a filling means which may be adjusted to vary the actual fill in accordance with the density of the granular material. This in turn means that the actual extent to which the pockets are filled must be changed.

For this reason, as well as others, it is not feasible in one operation to employ a delivery means such as a hopper acting to fill all of the pockets level full. Nor is it practicable to provide a hopper or delivery means which will deposit more than enough of the granular material to fill the pockets and to remove the excess by scraping, brushing or other means.

Briefly, in the practice of the invention, it has been found possible to attain the objects set forth above, by employing a hopper or other means depositing granules along the axis of a series of pockets in the moving member in such a way as to form a continuous deposit hereinafter called a ridge of granules, which ridge has a top central portion as high as or slightly higher than the tops of the lands, and side portions the upper parts at least of which are slanting and intersect the side walls of the pockets along a line between the top and bottom edges thereof. If the quantity of granules deposited in the ridge can be kept constant, it will be found that the same volumetric quantity of granules is deposited in each pocket of the series. The granules so deposited require only a redistribution in each pocket; and any portion of the granules extending above the tops of the pockets can be moved laterally into voids in the pockets provided by the fact that the sloping side portions of the ridge intersect the side walls of the pockets along lines below their top edges.

The quantity of granules deposited in the ridge can be kept constant under any given adjusted conditions by making use of the angle of repose of the granular material itself. If granules are allowed to flow from an orifice in the bottom of a container onto a horizontal surface, there will be an accumulation of granules on the surface beneath the orifice forming a mound of conical shape; but granules will cease flowing from the orifice as soon as the sloping walls of the conical mound intersect the edges of the orifice. The angularity of the sloping walls of the conical mound is determined by the angle of repose of the granular material. While the angle of repose will differ for different granular materials or for granules of different sizes and conditions, for any given condition and size of any given granular material, the angle of repose will be a constant. Thus, if all other circumstances remain the same, the angle of repose of the granular material deposited on the horizontal surface will determine the quantity of granules in the mound.

If a change is desired in the quantity so deposited, then a change must be made in some other circumstance. Such a change may comprise any or all of the following: a change in the cross-sectional dimension of the orifice, a change in the distance between the orifice and the surface upon which the deposit is being made, a change in the nature of the granules, and the like.

In the practice of this invention, the same principles apply. The cross-sectional shape of the continuous ridge may vary depending upon the position of the lines along which the sloping side portions of the ridge intersect the side walls of the pockets, so that most often the cross-sectional shape of the ridge will be substantially that of a triangle superposed on a rectangle. But the sloping upper portions of the ridge will have an angularity to the horizontal equal to the angle of repose of the particular granular material being deposited, so that the area of the transverse cross-section of the ridge will remain constant under any given adjusted conditions, but may readily be varied by changing the effective width of the opening in the hopper, the distance between the opening and the bottoms of the pockets, etc. Adjustments may be made first to deposit such quantity of granules in each pocket as, after the redistribution mentioned above, will fill each pocket to any desired level up to level full. Second, if a change occurs in the density of the granules, changes in the actual quantity of the fill can readily be made to compensate.

A minimum of material is deposited on the transverse lands of the moving member and usually none at all on the longitudinal lands. Any material on the lands is easily removed.

Referring now to FIG. 1, a continuously moving member in the form of a cylinder or drum is indicated at 1. This member is recessed as at 3 to form pockets. In accordance with the teachings of the copending application of Gex and Kramer, referred to above, a film of water-soluble material, such as polyvinyl alcohol is led onto the moving member and caused to adhere to the lands thereof. The film is in a stretchable condition, and by reason of vacuum connections to the recesses in the moving member, one of which connections is shown at 4, the film is drawn down into the recesses to form pockets 5. These pockets are then filled with the granular material to be packeted.

In FIG. 2 there is shown a hopper 6 which has a longitudinally elongated aperture 7 in its bottom. This aperture is substantially narrower than the width of the pocket 5. The granular material 8 which is in the hopper is a free-flowing material; it issues from the aperture 7 into the pocket 5; but the flow of the material will cease when the angular side faces 9 of the deposited ridge attain the angle of repose of the granular material. It will be clear in FIG. 2 also that raising or lowering the hopper 6 will control the quantity of material deposited in the ridge 10. Thus if the hopper were lowered to the position indicated in the dashed line 11, the angular faces of the ridge would occupy the position shown in the dashed lines 12, and the quantity of material in the pocket would be diminished accordingly. The figure also shows that narrowing the opening 7 to the width indicated in dotted lines at 7a would have an effect similar to lowering the hopper to the position 11.

The simplest way of adjusting the quantity of material deposited in the ridge is by raising or lowering the hopper 6; and it will be within the skill of the worker in the art to provide means (not shown) for holding the hopper at various adjustable heights. Another way of adjusting the quantity of the fill is shown in FIG. 1. Here the hopper 6 is pivoted at or adjacent to its upstream edge, as at 13. A tilting about this pivot will bring the downstream edge of it closer to or further away from the lands on the moving member 1. Yet another way of adjusting the volume of the fill is by providing a gate 14 in the lower downstream edge of the hopper, which gate can be raised and lowered. This is illustrated in FIG. 3.

The lower face of the hopper will normally be located quite close to the transverse lands of the moving member so as to minimize the quantity of granular material deposited on the central portion of the transverse lands as indicated at 15 in FIGS. 4 and 5. In the drawings of this application the moving member 1 has been illustrated as having only one longitudinal row of pockets and as having longitudinal lands 16 and 17 and lateral or transverse lands 18 and 19. It will be understood, however, that the moving member may carry as many longitudinal rows of pockets as may be desired for quantity production. In this event a separate hopper may be provided for each row or a common hopper may be provided with a separate aperture 7 for each of the rows.

The angular side faces 9 of the deposited ridge of granular material intersect the vertical walls of the pocket 5 at positions below the top edges of the walls. Consequently, none of the granular material will be deposited on the longitudinal lands 16 and 17 in normal operation.

The ridge depositing means hereinabove described is used in connection with a scraper element. The scraper is ordinarily formed with an outer metallic supporting member 20 and an inner resilient member 21 extending slightly below the lower edge of the member 20. The scraper will be supported with respect to the moving member 1 in any suitable way, as by brackets 22 and 23.

The height of the lower edge of the resilient part 21 of the scraper is adjusted to remove the portion 15 of the granular material from the transverse lands. The central portion of the scraper, as best shown in FIG. 4 has a rearwardly V-shaped configuration 24, which exerts a lateral spreading action on the granules. Thus the top of the deposited ridge is lowered at least to the level of the tops of the pockets; and the material from the top of the ridge is moved laterally into positions lying toward the side walls of the pocket. The extreme ends of the scraper are turned rearwardly as at 25 and 26 so that they can remove from the longitudinal lands 16 and 17 and deposit in the pockets any granular material which may reach these lands.

The result of the operation of the apparatus and process described is to produce a controlled volumetric filling of the pockets. The pockets, of course, cannot be over-filled, since if this happened there would be an accumulation of material on the moving member outside the hopper, which would have to be removed in some fashion. The volumetric filling is done by depositing a ridge such as is shown in FIG. 2; and the adjustment of the volumetric filling is easily accomplished as has been described. The pockets are in general slightly underfilled from the volumetric standpoint, and in no event are filled more than level full. It will be understood that when the pockets have been filled, a second strip of water-soluble thermoplastic film substance is led onto the first film and sealed to it on the lands. The apparatus and method of a copending application in the name of Schaefer entitled The Formation of Firm Flat Packets of Granular Substance, Serial No. 59,083 filed September 28, 1960, now abandoned in favor of a continuation-in-part application, Serial No. 222,768, filed September 6, 1962, and also assigned to the same assignee, may be employed to cause the layers of film substance to embrace the granular filling closely, despite variations in the volumetric fill.

Modifications may be made in the invention without departing from the spirit of it. The invention having been described in certain exemplary embodiments, what is claimed as new and desired to be secured by Letters Patent is:

1. A process for the controlled volumetric filling of granules into open top pockets carried by a moving member, said pockets having side walls, which comprises providing a delivery means for granular material, moving said pockets continuously beneath said delivery means, causing said granular material to flow freely and issue continuously from said delivery means so as to form on said moving member a ridge thereof in said pockets, said ridge having sloping sides intersecting the side walls of said pockets below the tops thereof, the quantity of granular material in said ridge being constant because of the angle of repose of said granular material, and thereafter distributing the granular material in said ridge within each pocket.

2. The process claimed in claim 1 including the step of adjusting the quantity of granular material deposited in said ridge by adjusting the relationship between the moving member and the delivery means so as to vary the positions of intersection between the sloping sides of the ridge and the side walls of the said pockets.

3. The process claimed in claim 2 wherein the step of adjusting the quantity of material includes the step of changing the distance between said delivery means and said moving member.

4. The process claimed in claim 3 wherein the step of distributing the granular material within each pocket includes the step of moving portions of said granular material laterally of the axis of said ridge upon passage of said pockets beyond said delivery means whereby to lower the top of said ridge to at least the level of the tops of said pockets.

5. The process claimed in claim 3 wherein the step of distributing the granular material within each pocket includes the step of moving portions of said granular material laterally of the axis of said ridge upon passage of said pockets beyond said delivery means whereby to lower the top of said ridge to at least the level of the tops of said pockets, said moving member having lands between said pockets and said distributing step including the removal from said lands of any portion of said granular material deposited thereon.

6. Apparatus for the controlled volumetric filling of granules into pockets which comprises a moving member having recesses in alignment, said recesses being separated and surrounded by marginal lands, said moving member carrying a film of packeting substance distorted into said recesses so as to form pockets having side walls, a delivery means for granular material having an opening therein narrower than said pockets, said delivery means being juxtaposed to said moving member so as to deposit thereon continuously a ridge of granular substance having sloping sides intersecting the side walls of said pockets below the tops thereof, said ridge being in alignment with aligned pockets carried by said moving member, the quantity of granular material in said ridge being maintained constant by the angle of repose of said granular material, and distributing means acting on said deposited ridge upon passage of said pockets beyond said delivery means to distribute the granular material therein within each pocket.

7. Apparatus as claimed in claim 6 including means for adjusting the quantity of granular material deposited in said pockets by adjusting the relationship of said delivery means to said moving member so as to vary the positions of intersection between the sloping sides of said ridge and the side walls of said pockets.

8. Apparatus as claimed in claim 6 in which said distributing means is a hopper supported above aligned pockets carried by said moving member.

9. Apparatus as claimed in claim 6 in which said distributing means is a hopper supported above aligned pockets carried by said moving member, and means for adjusting the distance between said hopper and said moving member whereby to adjust the quantity of granular material deposited in said ridge.

10. Apparatus as claimed in claim 6 in which said distributing means is a hopper supported above aligned pockets carried by said moving member, and means for tilting said hopper so as to vary the distance between the downstream end thereof and said moving member.

11. The structure claimed in claim 8 wherein said hopper has a substantially vertical downstream wall with a sliding gate therein, the volume of fill being variable by raising or lowering the said sliding gate.

12. The structure claimed in claim 8 wherein said distributing means for the granular material is a scraper element supported with respect to said moving member, a central portion of said scraper element having a substantially V-shaped configuration with its apex disposed toward the delivery means for granular material whereby to exert a lateral force in distributing the said granular material.

13. The structure claimed in claim 8 wherein said distributing means for the granular material is a scraper element supported with respect to said moving member, a central portion of said scraper element having a substantially V-shaped configuration with its apex disposed toward the delivery means for granular material whereby to exert a lateral force in distributing the said granular material, said scraper also having angularly related portions at its ends, said portions being turned rearwardly in a direction opposite to the direction of movement of said moving member and thereby acting to remove from the longitudinal lands alongside said pockets any granular material deposited thereon.

References Cited in the file of this patent

UNITED STATES PATENTS

| | | |
|---|---|---|
| 356,450 | Coleman | Jan. 27, 1887 |
| 906,214 | Freeman | Dec. 8, 1908 |
| 954,632 | Hughes | Apr. 12, 1910 |
| 1,815,321 | Martin | July 21, 1931 |
| 2,138,356 | Ryan et al. | Nov. 29, 1938 |
| 2,524,243 | Wicklund | Oct. 3, 1950 |
| 2,644,617 | Stirn et al. | July 7, 1953 |
| 2,720,353 | Stirn et al. | Oct. 11, 1955 |
| 2,749,006 | Naruo | June 5, 1956 |
| 2,775,267 | Stirn et al. | Dec. 25, 1956 |
| 2,910,212 | Kerr | Oct. 27, 1959 |
| 2,949,711 | Vogt | Aug. 23, 1960 |

FOREIGN PATENTS

| | | |
|---|---|---|
| 324,368 | Germany | Aug. 24, 1920 |
| 598,135 | Great Britain | Feb. 11, 1948 |